United States Patent
Kim et al.

(10) Patent No.: US 7,890,289 B2
(45) Date of Patent: Feb. 15, 2011

(54) PORTABLE TERMINAL FOR MEASURING REFERENCE TILT AND METHOD OF MEASURING REFERENCE TILT USING THE SAME

(75) Inventors: Young-Wan Kim, Gunpo-si (KR);
Won-Chul Bang, Seongnam-si (KR);
Dong-Yoon Kim, Seoul (KR)

(73) Assignee: Samsung Electronics Co., Ltd (KR)

( * ) Notice: Subject to any disclaimer, the term of this patent is extended or adjusted under 35 U.S.C. 154(b) by 376 days.

(21) Appl. No.: 11/433,685

(22) Filed: May 12, 2006

(65) Prior Publication Data

US 2006/0260397 A1 Nov. 23, 2006

(30) Foreign Application Priority Data

May 20, 2005 (KR) .............. 10-2005-0042308

(51) Int. Cl.
*G01C 9/00* (2006.01)
(52) U.S. Cl. .............. 702/151; 702/154
(58) Field of Classification Search ........... 702/141, 702/151, 153, 145, 150, 152, 154; 33/355 R; 715/850, 851; 345/156–158, 162
See application file for complete search history.

(56) References Cited

U.S. PATENT DOCUMENTS

| | | | |
|---|---|---|---|
| 6,201,554 B1 * | 3/2001 | Lands | 345/169 |
| 7,424,385 B2 * | 9/2008 | Cho et al. | 702/141 |
| 2004/0012566 A1 | 1/2004 | Bradski | 345/169 |
| 2005/0065728 A1 * | 3/2005 | Yang et al. | 701/220 |
| 2005/0222802 A1 * | 10/2005 | Tamura et al. | 702/150 |
| 2006/0100820 A1 * | 5/2006 | Davidson | 702/151 |
| 2006/0174685 A1 * | 8/2006 | Skvortsov et al. | 73/1.37 |
| 2006/0255139 A1 * | 11/2006 | Lee et al. | 235/439 |

FOREIGN PATENT DOCUMENTS

| | | |
|---|---|---|
| EP | 0 825 514 | 2/1998 |
| GB | 2 347 593 | 9/2000 |

(Continued)

OTHER PUBLICATIONS

Answers.com, definition of standard deviation, printed Sep. 30, 2008.*

(Continued)

*Primary Examiner*—Michael P Nghiem
(74) *Attorney, Agent, or Firm*—The Farrell Law Firm, P.C.

(57) ABSTRACT

The present invention discloses a portable terminal that measures a reference tilt and a method of measuring the reference tilt using the same. The portable terminal includes a movement sensor for measuring a tilt of the portable terminal using a gravitational acceleration value, and a controller for dividing a preset time into separate time sections and measuring an acceleration value in each separate time section by using the movement sensor, calculating a standard deviation of the accelerations in each separate time section and determining one time section in which movement is minimal, and calculating a tilt of the portable terminal from an average of the accelerations in the determined one time section or a sum of weight acceleration values therein and setting the calculated tilt as the reference tilt of the portable terminal.

8 Claims, 4 Drawing Sheets

FOREIGN PATENT DOCUMENTS

| | | |
|---|---|---|
| JP | 2001-272413 | 10/2001 |
| KR | 10-2002-0045382 | 6/2002 |
| KR | 10-0537279 | * 12/2005 |
| KR | 10-0571849 | * 4/2006 |
| WO | WO 01/56256 | 8/2001 |
| WO | WO 01/86920 | 11/2001 |

OTHER PUBLICATIONS

English translation of KR 10-0537279, Dec. 2005.*
English translation of KR 10-0571849, Apr. 2006.*

* cited by examiner

PORTABLE TERMINAL FOR MEASURING REFERENCE TILT AND METHOD OF MEASURING REFERENCE TILT USING THE SAME

PRIORITY

This application claims priority under 35 U.S.C. §119 to an application entitled "Portable Terminal For Measuring Reference Tilt And Method Of Measuring Reference Tilt Using The Same" filed in the Korean Intellectual Property Office on May 20, 2005 and assigned Serial No. 2005-42308, the contents of which are incorporated herein by reference.

BACKGROUND OF THE INVENTION

1. Field of the Invention

The present invention relates to a portable terminal for measuring a reference tilt and a method of measuring the reference tilt. Particularly, the present invention relates to a portable terminal including a movement sensor for measuring a reference tilt using a gravitational acceleration value and a method of measuring the reference tilt.

2. Description of the Related Art

In recent years, the use of portable terminals such as a mobile communication terminal or personal digital assistant (PDA) has dramatically increased. These portable terminals find wide use in many applications such as making a phone call, managing a schedule, taking a picture with the use of a built-in digital camera, viewing a satellite broadcasting or enjoying a game. Specifically, as the number of games for the portable terminals has significantly increased, these terminals have adapted various shapes and functions suitable for enjoying the games. Generally, a portable terminal is manipulated using a keypad or a touch screen. It can also be manipulated by its' movement and tilt with the inclusion of a movement-detecting sensor. Therefore, when reading a book displayed on the portable terminal, a scroll function can be manipulated by tilting the portable terminal, without manipulating a scroll bar. In addition, new games using this technique are being developed.

A portable terminal for playing a game using its detected tilt as well as a button of the keypad requires a movement sensor to detect the tilt and the movement information. There are various types of movement sensors, and a representative type is a sensor using an accelerometer.

FIG. 1 illustrates an acceleration value measured by a movement sensor. In FIG. 1, the acceleration measured by the movement sensor is a gravitational acceleration. The movement sensor calculates an acceleration $A_x(t)$ of an x-axis 100, an acceleration $A_y(t)$ of a y-axis 110, and an acceleration $A_z(t)$ of a z-axis with respect to time (t), and measures the variation of the acceleration according to time. In this manner, the movement sensor measures the tilt and the position change of the portable terminal.

The movement sensor is used as a part of an inertial navigation system (INS) in such vehicles as an airplane, vessel or missile. In the inertial navigation system, a roll angle Roll($\Phi$) of the x-axis and a pitch angle Pitch($\theta$) of the y-axis are calculated from Equation (1) below.

$$\phi = a\tan 2(-A_y, -A_z)$$
$$\theta = a\tan 2(A_x, \sqrt{A_y^2 + A_z^2}) \quad (1)$$

where a tan 2(a, b) is arg(b+ia), i is an imaginary unit, and arg is an argument of a complex number. Here, Equation (1) above may be modified.

When the portable terminal with the movement sensor is used to enjoy a game, a relative tilt value with respect to a certain state is needed. That is, a starting state in which the user can conveniently manipulate and tilt the portable terminal to conveniently enjoy the game, is required. This tilt will be referred to as a reference tilt.

At a time when a button such as a game start button of the portable terminal is pressed, tilt information of the portable terminal is measured as the reference tilt.

However, when the reference tilt is measured at the press of the button, an accurate measurement of the reference tilt is difficult due to vibration occurring when the button is pressed. This problem becomes more serious in a small-sized terminal because the error increases. Also, if the user is moving when pressing the button, an acceleration component due to the movement is reflected in Equation (1) above and thus the reference tilt cannot be measured accurately.

SUMMARY OF THE INVENTION

The present invention provides a portable terminal measuring a reference tilt to improve accuracy.

Also, the present invention provides a method of measuring a reference tilt with improved accuracy.

According to the present invention, there is provided a portable terminal measuring a reference tilt, including a movement sensor for measuring a tilt of the portable terminal using a gravitational acceleration, and a controller for dividing a preset time into separate time sections and measuring an acceleration value in each time section by using the movement sensor, calculating a standard deviation of the acceleration in the separate time sections and determining one time section in which movement is minimal, and calculating a tilt from an average of the accelerations in the determined one time section or a sum of weight values therein and setting the calculated tilt as the reference tilt of the portable terminal.

According to the present invention, there is provided a method of measuring a reference tilt of a portable terminal, including dividing a time into separate time sections and measuring an acceleration in the time sections, calculating a standard deviation in the separate time sections by using the measured accelerations, determining one time section in which the calculated standard deviation continuously falls below a preset critical value over a preset number of repetitions, and calculating a tilt from an average of the accelerations in the determined one time section or a sum of weight values therein and setting the calculated tilt as the reference tilt of the portable terminal.

BRIEF DESCRIPTION OF THE DRAWINGS

The above and other objects, features and advantages of the present invention will become more apparent from the following detailed description when taken in conjunction with the accompanying drawings, in which.

DETAILED DESCRIPTION OF THE PREFERRED EMBODIMENTS

Reference will now be made in detail to the preferred embodiments of the present invention, examples of which are illustrated in the accompanying drawings. A detail description of well-known features will be omitted for the sake of clarity and conciseness.

The present invention provides a portable terminal with a movement sensor. Specifically, the present invention provides a portable terminal measuring a reference tilt and a method of measuring the reference tilt.

Figure 1:
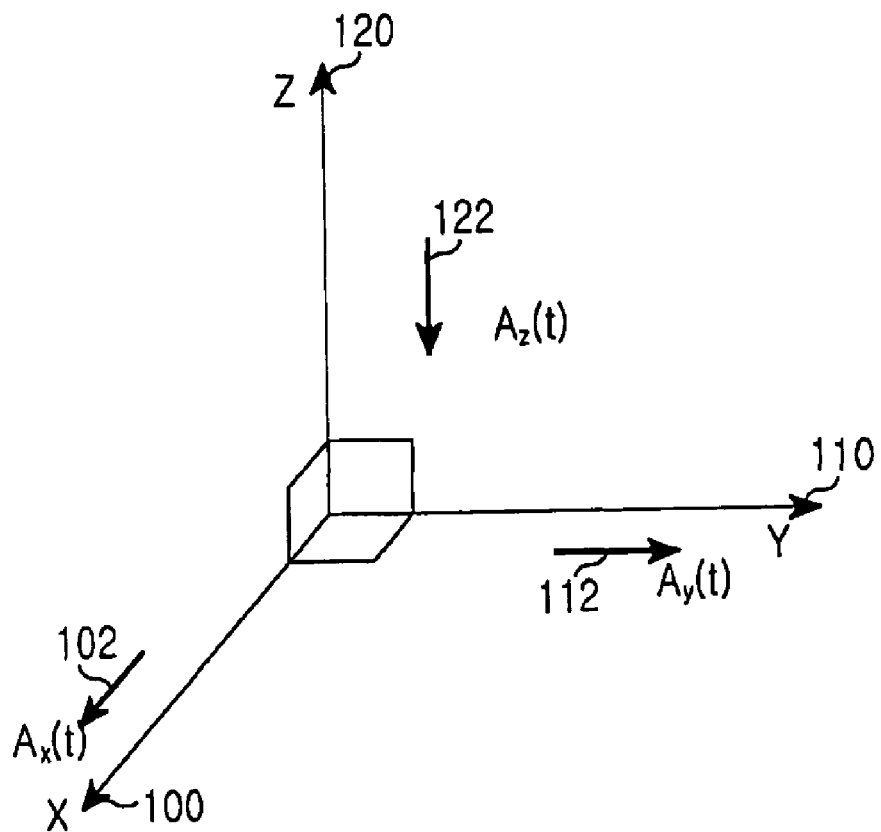
FIG. 1 illustrates an acceleration value measured by a conventional movement sensor.
Figure 2:
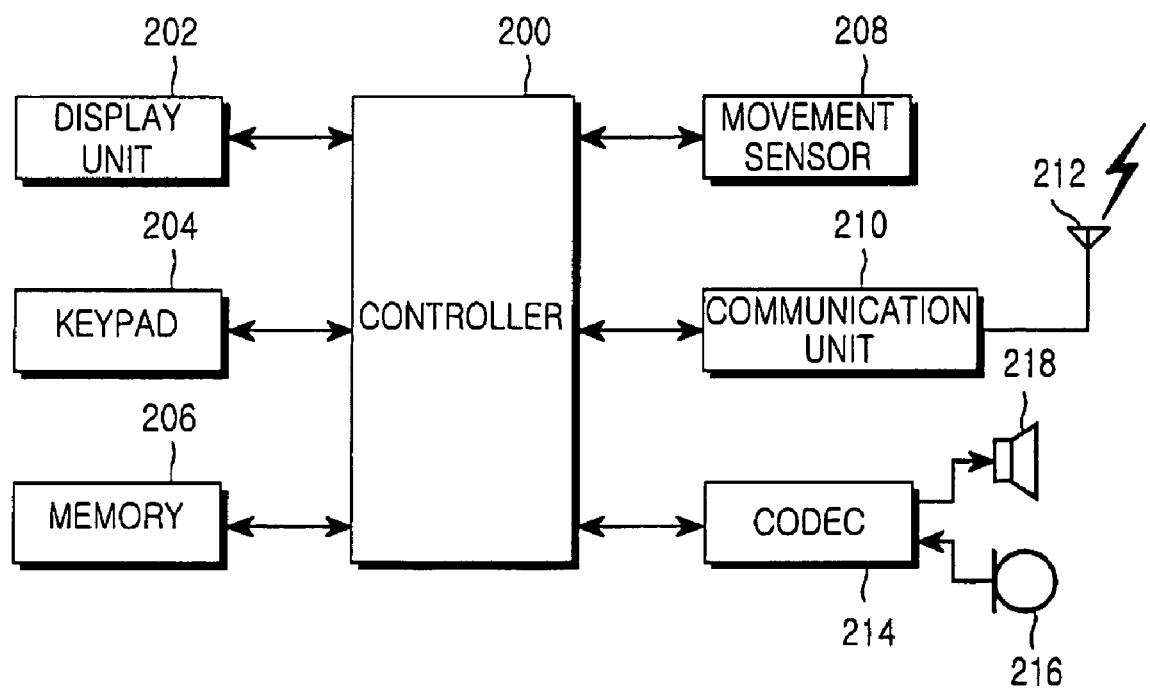
FIG. 2 is a block diagram of a portable terminal measuring a reference tilt according to the present invention.

FIG. 2 is a block diagram of a portable terminal measuring a reference tilt according to the present invention.

Referring to FIG. 2, the portable terminal includes a controller 200, a display unit 202, a keypad 204, a memory 206, a movement sensor 208, a communication unit 210, an antenna 212, a coder-decoder (codec) 214, a microphone 216 and a speaker 218.

The controller 200 controls an overall operation of the portable terminal for video communication. For example, the controller 200 processes and controls a voice communication and a data communication. Also, the controller 200 measures a reference tilt using the movement sensor. A detailed description of the general process and control operations of the controller 200 will be omitted here.

The display unit 202 displays status information (or indicator) generated during operations such as numerals and characters, moving pictures and still pictures. A color liquid crystal display (LCD) may be used for the display unit 202.

The keypad 204 includes numeric keys of digits 0-9 and a plurality of function keys, such as a Menu key, a Cancel (Delete) key, a Conformation key, a Talk key, an End key, an Internet connection key and Navigation keys (▲/▼/◄/►). In addition to the general functions, the keypad 204 further includes a tilt measuring button such that key input data corresponding to a key pressed by the user is transferred to the controller 200.

The memory 206 stores a program for controlling an overall operation of the portable terminal. Also, the memory 206 temporarily stores data generated during operations and complementary data (e.g., a telephone number, an SMS message and picture data).

The movement sensor 208 measures status information of the portable terminal. The movement sensor 208 is a type of acceleration measuring device that measures an acceleration value acting on the portable terminal.

Upon a reception operation, the communication unit 210 performs a despreading and a channel decoding of a received signal by down-converting a frequency of an RF signal received through the antenna 212. Upon a transmission operation, the communication unit 210 performs a channel coding and a spreading of data, up-converts a frequency of the channel-coded and spread data and transmits the frequency through the antenna 212. Also, the communication unit 210 receives an identification number of a base station through a pilot channel.

The codec 214 connected to the controller 200, and the microphone 216 and the speaker 218 connected to the codec 214 serve as an audio input/output block for a voice communication. The controller 200 produces pulse code modulation (PCM) data and the CODEC 214 converts the PCM data into analog audio signals. The analog audio signals are outputted through the speaker 218. Also, the codec 214 converts audio signals received through the microphone 216 into PCM data and provides the PCM data to the controller 200.

Figure 3:
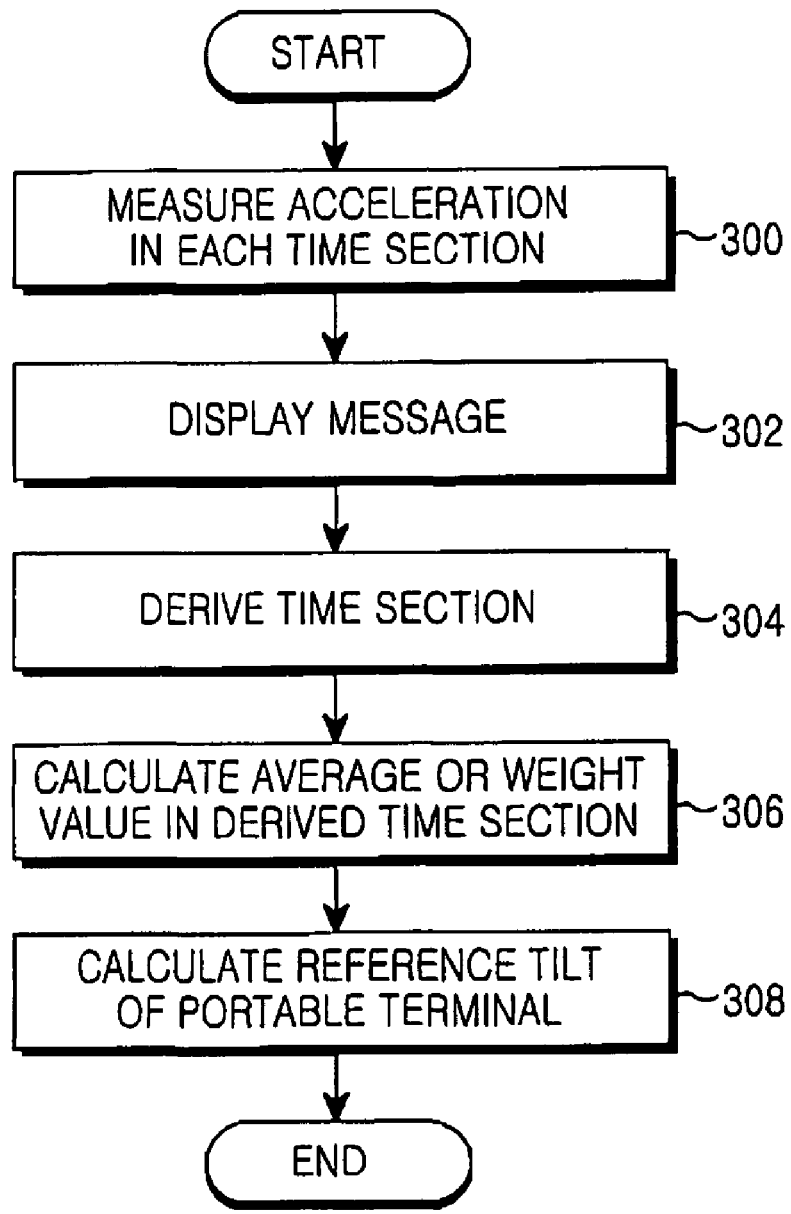
FIG. 3 is a flowchart illustrating a method of measuring a reference tilt in a time section according to the present invention.

FIG. 3 is a flowchart illustrating a method of measuring the reference tilt in a time section according to the present invention.

In operation 300, a time is divided into time sections and an acceleration value is measured in each time section.

In operation 302, a message instructing the user to hold the portable terminal in an unwavering position is displayed for a period of time during measuring the acceleration in operation 302.

In operation 304, a standard deviation of the acceleration is calculated in each time section by using the acceleration values measured in each time section in operation 300. Then, a time section in which movement is minimal is determined. This is a time section in which the deviation of the accelerations continuously falls below a threshold value over a preset number of repetitions.

In operation 306, an average of an x-axis acceleration $A_x(t)$, a y-axis acceleration $A_y(t)$ and a z-axis acceleration $A_z(t)$ in the determined time section (B) is calculated in Equation (2) below, or a sum of weight acceleration values is calculated in Equation (3) below.

$$A_{xm} = \frac{\sum_{t \in B} A_x(t)}{N} \quad (2)$$

$$A_{ym} = \frac{\sum_{t \in B} A_y(t)}{N}$$

$$A_{zm} = \frac{\sum_{t \in B} A_z(t)}{N}$$

(N: Frequency of acceleration measurement at section B)

$$A_{xw} = \sum_{t \in B} w(t) A_x(t) \quad (3)$$

$$A_{yw} = \sum_{t \in B} w(t) A_y(t)$$

$$A_{zw} = \sum_{t \in B} w(t) A_z(t)$$

In Equation (3), the sum of all weight values (w(t)) is equal to "1" with respect to time (t). As the starting time of the game approaches, the portable terminal user is expected to remain motionless. Therefore, as the starting time of the game approaches, greater weight values can be assigned.

In operation 308, using either the average of accelerations or the sum of the weight acceleration values calculated in operation 306, a reference position (that is, a reference tilt) of the portable terminal is calculated from Equation (1).

Figure 4:
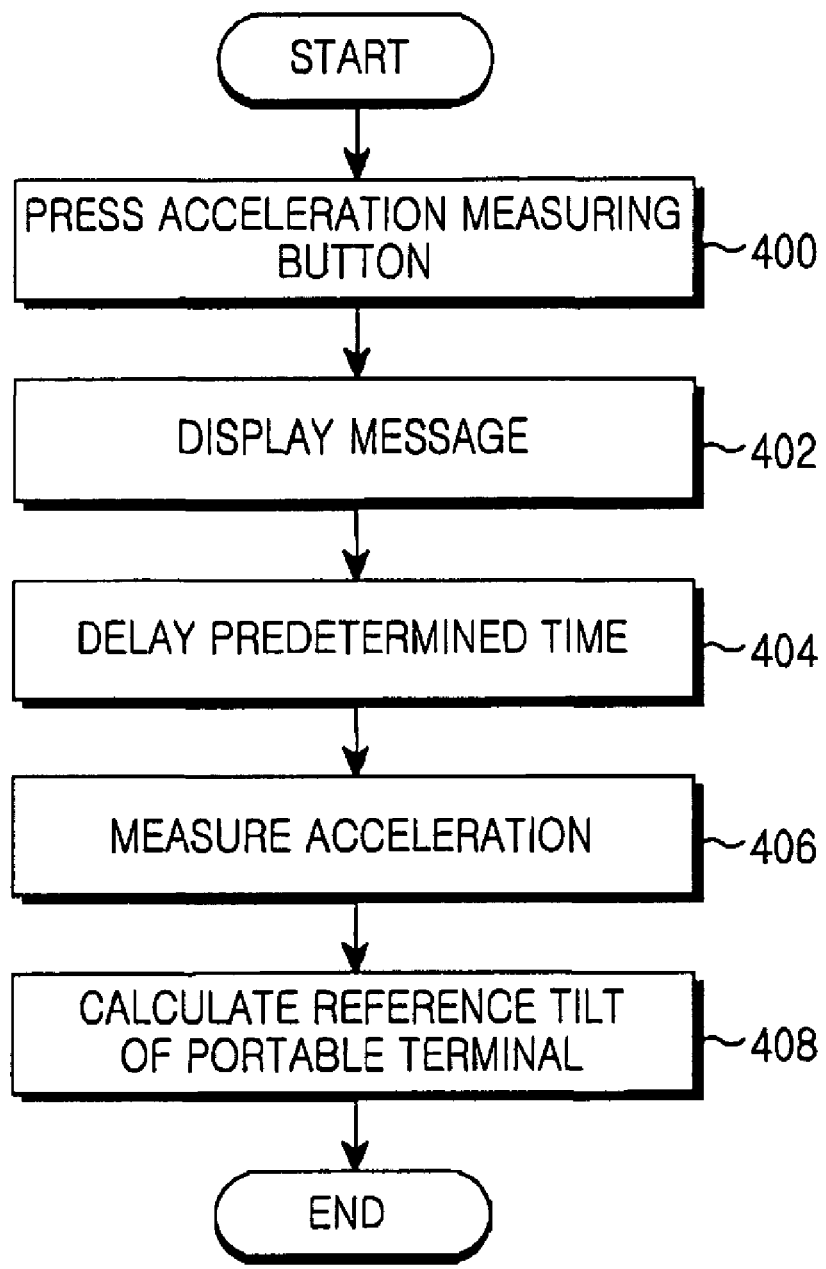
FIG. 4 is a flowchart illustrating a method of measuring a reference tilt after a time delay according to the present invention.

FIG. 4 is a flowchart illustrating a method of measuring a reference tilt after a time delay according to the present invention.

Referring to FIG. 4, in operations 400 and 402, when an acceleration measuring button is pressed, a message instructing the user to hold the portable terminal in an unwavering position is displayed.

In operations 404 and 406, a time delay occurs and an acceleration of each axis is measured.

In operation 408, using the measured acceleration of each axis, the reference tilt of the portable terminal is calculated from Equation (1).

According to the present invention, the portable terminal measuring the reference tilt includes a movement sensor for measuring a tilt of the portable terminal using a gravitational acceleration value, and a controller for dividing a preset time into time sections and measuring an acceleration value in each time section by using the movement sensor, calculating a standard deviation of the acceleration in each time section and determining a time section in which movement is minimal, and calculating a tilt from an average of the accelerations in the determined time section or a sum of weight values therein and setting the calculated tilt as the reference tilt of the portable terminal, whereby error occurring in measuring the reference tilt can be reduced.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A portable terminal, comprising:
   a movement sensor for measuring a tilt of the portable terminal using a gravitational acceleration value; and
   a controller for dividing a preset time into separate time sections and measuring an acceleration value in each of the time sections by using the movement sensor, calculating a standard deviation of the accelerations in each of the separate time sections, determining one time section in which movement is minimal based on the standard deviation, calculating a tilt of the portable terminal from an average of the acceleration values in the determined one time section, and setting the calculated tilt as a reference tilt of the portable terminal.

2. A portable terminal of claim 1, wherein the portable terminal is a mobile telephone terminal.

3. A portable terminal, comprising:
   a movement sensor for measuring a tilt of the portable terminal using a gravitational acceleration value; and
   a controller for dividing a preset time into separate time sections and measuring an acceleration value in each of the time sections by using the movement sensor, calculating a standard deviation of accelerations in each of the separate time sections, determining one time section in which movement is minimal based on the standard deviation, calculating a tilt of the portable terminal from a sum of weight acceleration values in the determined one time section, and setting the calculated tilt as a reference tilt of the portable terminal.

4. A method of measuring a reference tilt of a portable terminal including a controller, comprising:
   dividing, by the controller, a time period into separate time sections and measuring an acceleration in each of the time sections;
   calculating, by the controller, a standard deviation of accelerations in each of the separate time sections by using the measured accelerations;
   determining, by the controller, one time section in which the calculated standard deviation continuously falls below a threshold value over a preset number of repetitions; and
   calculating, by the controller, a tilt from an average of the acceleration values in the determined one time section, and setting the calculated tilt as the reference tilt of the portable terminal.

5. A method of measuring a reference tilt of a portable terminal including a controller, comprising:
   dividing, by the controller, a time period into separate time sections and measuring an acceleration value in each of the time sections;
   calculating, by the controller, a standard deviation of accelerations in each of the separate time sections by using the measured accelerations;
   determining, by the controller, one time section in which the calculated standard deviation continuously falls below a threshold value over a preset number of repetitions; and
   calculating, by the controller, a tilt from a sum of weight acceleration values in the determined one time section, and setting the calculated tilt as the reference tilt of the portable terminal.

6. A method of measuring a reference tilt of a portable terminal including a movement sensor and a controller, comprising:
   dividing, by the controller, a preset time into separate time sections;
   delaying, by the controller, a time period after starting measurement of the reference tilt;
   measuring, by the movement sensor, a tilt after the delayed time, and setting, by the controller, the measured tilt as the reference tilt of the portable terminal,
   wherein measuring the tilt includes
      measuring an acceleration value in each of the separate time sections by using a movement sensor;
      calculating a standard deviation of accelerations in each of the separate time sections, and determining one time section in which movement is minimal based on the standard deviation; and
      calculating the tilt of the portable terminal from an average of the acceleration values in the determined one time section.

7. A method of claim 6, further comprising pressing a measuring button for measuring the reference tilt before performing the delaying step.

8. The method of claim 6, wherein measuring the tilt further includes:
   calculating the tilt of the portable terminal from a sum of weight acceleration values in the determined one time section.

* * * * *